(12) United States Patent
Dennis et al.

(10) Patent No.: US 12,398,768 B2
(45) Date of Patent: Aug. 26, 2025

(54) BALL RAMP CALIPER BRAKE WITH MONOCAST HOUSING AND COPLANAR SPRINGS

(71) Applicant: Ausco Products, Inc., Benton Harbor, MI (US)

(72) Inventors: Brian Dennis, Kalamazoo, MI (US); Evan Whitney, Buchanan, MI (US); Keith McAllister, Kalamazoo, MI (US); Donald Schmidt, Benton Harbor, MI (US)

(73) Assignee: Ausco Products, Inc, Benton Harbor, MI (US)

( * ) Notice: Subject to any disclaimer, the term of this patent is extended or adjusted under 35 U.S.C. 154(b) by 568 days.

(21) Appl. No.: 17/983,817

(22) Filed: Nov. 9, 2022

(65) Prior Publication Data
US 2024/0151281 A1    May 9, 2024

(51) Int. Cl.
| | |
|---|---|
| *F16D 55/2255* | (2006.01) |
| *F16D 65/00* | (2006.01) |
| *F16D 65/18* | (2006.01) |
| *F16D 55/00* | (2006.01) |
| *F16D 121/14* | (2012.01) |
| *F16D 125/36* | (2012.01) |
| *F16D 125/64* | (2012.01) |
| *F16D 127/02* | (2012.01) |

(52) U.S. Cl.
CPC ..... *F16D 55/2255* (2013.01); *F16D 65/0068* (2013.01); *F16D 65/18* (2013.01); *F16D 2055/0029* (2013.01); *F16D 2121/14* (2013.01); *F16D 2125/36* (2013.01); *F16D 2125/64* (2013.01); *F16D 2127/02* (2013.01)

(58) Field of Classification Search
CPC .. F16D 55/2255; F16D 65/0068; F16D 65/18; F16D 2055/0029; F16D 2121/14; F16D 2125/36; F16D 2125/64; F16D 2127/02
USPC ................ 188/72.7–72.9, 73.43, 73.47, 370
See application file for complete search history.

(56) References Cited

U.S. PATENT DOCUMENTS

| | | | |
|---|---|---|---|
| 5,529,150 A | 6/1996 | Buckley et al. | |
| 5,727,659 A * | 3/1998 | Brown ............... | F16D 55/2262 188/73.36 |
| 7,040,462 B2 | 5/2006 | Dennis et al. | |
| 8,662,260 B2 | 3/2014 | Baldeosingh et al. | |

(Continued)

*Primary Examiner* — Christopher P Schwartz
(74) *Attorney, Agent, or Firm* — Renner, Kenner, Greive, Bobak, Taylor & Weber (57) ABSTRACT

A ball ramp caliper brake is disclosed. The brake can include a housing having an actuator side with a first pad nearer thereto and a carrier side with a second pad nearer thereto; the actuator side including ball ramps on an inner part, and threaded holes, the carrier side including housing holes therethrough; bolts respectively passing through one of the housing holes and respectively threaded into one of the threaded holes, to thereby compress a respective spring against the first pad; a lever having ball ramps facing the actuator side ball ramps; and a plurality of balls each being between respective ones of the ball ramps; wherein the springs are positioned coplanar with a radial center of the ball ramps, such that force of the springs provides constant compressive load on the ball ramps, and such that the force does not cause the first pad to tip.

19 Claims, 6 Drawing Sheets

(56) References Cited

U.S. PATENT DOCUMENTS 8,991,566 B2  3/2015  Pozivilko et al.
2024/0229873 A1\*  7/2024  Fiacchino ............. F16D 65/183

\* cited by examiner

SECTION A-A
FIG. 3

SECTION B-B
FIG. 4

SECTION C-C

BALL RAMP CALIPER BRAKE WITH MONOCAST HOUSING AND COPLANAR SPRINGS

TECHNICAL FIELD

This invention relates to a ball ramp caliper brake. In one or more embodiments, this invention relates to a ball ramp caliper brake including a monocast housing. In one or more embodiments, this invention relates to a ball ramp caliper brake including springs that are coplanar with a radial center of ball ramps.

BACKGROUND

Conventional mechanical caliper brakes are commonly mounted inside a wheel. To service the brakes, the wheel can be removed, and sufficient open radial space generally exists above the brake. As such, the brake can be easily removed by unmounting the brake and moving the brake radially off the wheel disc. These scenarios provide for relative ease of service.

In other applications, removal of the wheel may not be an option for servicing the brakes. In some applications such as roller compactors, there is no wheel. The vehicle is driven on two steel drums (front and rear), and the brake is mounted inside the drum. In this example, mounting brackets may wrap around from outside a drum as the brackets may be needed to provide bearing support for the ends of the drums. Brackets may also be used to mount a motor and the brake.

For servicing certain of these brakes, servicing the brake may not be as easy as simply removing the wheel and then removing the brake. The brake can be buried into the drum, which would require removal of the drum, which would require extra effort. Moreover, removal of the brake from the rotor while both are still inside the drum would require certain extra steps that may be difficult or impossible based on the radial height of certain conventional mechanical calipers.

In order for a brake to be assembled and disassembled inside of a drum requires an exceptionally narrow radial width. One problem in this regard is certain conventional calipers have a bridge going across the top of the brake over the rotor. When clamping forces are placed on lined stators, this force is transferred across the bridge to the other side of the brake. Where the bridge is radially offset from the clamp force, a bending moment is applied to the bridge. To resist this moment, the bridge must have radial height to create sufficient moment of inertia and stiffness. Thus, some conventional brakes are relatively tall in the radial direction. Again, this large radial height can be required in order to produce high section properties to resist bridge bending.

One way to avoid this is to use a 'bridgeless' design. U.S. Pat. No. 7,040,462 discloses stampings at both ends of the brake, the stampings being assembled with bolts and spacers that are coplanar with the ball ramp actuating mechanism whose force is generally centered at component. This eliminates the bending moment in the radial direction since the radial distance between the bridge and the clamp force is zero. Thus, the brake of the '462 patent does not require a high radial height to produce a high moment of inertia, because there is no applied moment in that direction.

The brake of the '462 patent may have limitations in certain applications. While the bending moment is not radial, there is a significant bending moment between the two bolts. The bending moment has been redirected from the radial to the tangential direction, and thus the stampings are in bending moment between the bolts. The bolts and spacers themselves cannot and do not resist moment loads, i.e., the joint between the stampings and the bolts/spacers is a simple support. The bolt and spacer resist forces, not moments. This exacerbates deflection and stress in stampings. The '462 patent discloses ribs on the inboard stamping to resist this moment. The outer stamping has a lining in contact with the rotor that distributes load more evenly to reduce the bending load, so ribs are not required. The ribs and lining configuration work well, if the distance between the bolts is relatively small, such that the applied moment load is relatively small.

However, the distance between the bolts is not always small. The bolts of the '462 patent have to be outside of the rotor to span the axial length across the brake. As the rotor becomes larger, the distance between the bolts becomes larger (i.e. brake becoming longer tangentially) and thus so does the bending moment on the stampings. This generally makes the brake of the '462 patent applicable to small vehicles where the rotor size is small, and the distance between the bolts is small, and thus allows the stampings to be used to make a cost-effective product. Where a rotor is larger in diameter, it may be impractical to use stampings and bolts/spacers as taught in the '462 patent.

One way to resolve the need to make the brake longer tangentially is to use a housing cast in one piece, which may be referred to as a monocast design. A monocast design is not simply supported like the stampings taught in the '462 patent. A monocast design is a rigid support that can resist both moment and force loads, and it can be used on larger rotors. An example of a monocast design is U.S. Pat. No. 8,991,566. The '566 patent discloses bridge extensions, which improve the rigidity of the bridge by moving at least part of the bridge down below the line of action of the piston (i.e. the line of action of the actuating force). This can be done to make the brake small radially to fit a relatively narrow package. However, there may still be material above the rotor forming the main part of the bridge and material below the centerline of the brake creating a high moment of inertia while limiting radial height. It may be desirable to eliminate the need for the material above the rotor in the bridge to further reduce the effective radial height.

Turning to the subject of mounting a brake, certain mounts utilize a floating mount design. Certain conventional brakes can be mounted on two spacers, where the spacers are mounted inside bushings, with the bushings being press fit into holes formed in a housing. A wiper may be utilized to seal the bore and the spacer to prevent water and dirt intrusion into the bushing/spacer interface. The brake may be mounted on a rotor, such that stator assemblies straddle the rotor.

In a floating mount caliper, the actuation force comes from just one side, commonly referred to as the actuator side. This may include hydraulic pressure being applied to a piston for the piston to push a stator assembly into contact with the rotor. Following Newton's third law of motion, the force of the piston acting on the rotor (e.g. pushing to the right) causes an equal and opposite reaction; the rotor pushes back axially on the brake (e.g. pushing to the left). However, a brake may be intentionally not rigidly mounted in the axial direction. It can instead be mounted on the spacers inside of the bushings, as described above. Thus, force from the rotor pushes back against the brake, and the entire brake assembly slides (e.g. to the left). The brake continues to 'float' on the spacers inside the bushings, until the stator assembly comes into contact with the opposite side of the rotor. The side of the brake containing the stator assembly is commonly referred to as the carrier side. This floating motion causes the second stator assembly to experience essentially the same actuation force as the first stator assembly (notwithstanding some loss of force due to friction). The first stator assembly pushing against the opposite side of the rotor reacts the force of the second stator assembly pushing on the same rotor, which is a floating mount caliper.

Turning to the subject of a brake actuation mechanism, ball ramp technology is known to be used in mechanical caliper brakes. For example, the '462 patent discloses a stamped ball ramp mechanism. The lever contains ball ramps that are formed by stamping. The lever contains three spherical protrusions that ride on a washer, with the washer riding on shims. The washer, shims, and the lever are all held concentric to a hole by a spring pin, which is pressed into the lever. However, there may be instances where one or both sides of the ball ramp (e.g. the stationary actuator side) cannot utilize stamping to form the ball ramp mechanism.

In the ball ramp mechanism of the '462 patent, a spring keeps constant compressive load on the ball ramp mechanism. This keeps the balls in their position on the ramp. In absence of the spring, the clearance between the lever and the stator pad would generally increase as the brake wears. Eventually, there would be enough clearance that the balls would become loose and fall out of location relative to one another. The spring keeps constant compressive load on the balls and keeps the balls in proper location. This design also ensures the stator pads are positively pushed away from the rotor, preventing unwanted contact, and the springs further act to aid in returning the lever to its rest position when braking action is complete. Since the spring is coplanar with the center of the ball ramp mechanism and stator pads, the spring does not apply a moment to the stator pads. If the spring force is above or below center of the stator pad, the moment induced by the offset can cause the pad to tip and create unwanted contact between the lining and the rotor causing drag and wear. Also, the spring is wrapped around a spacer. In certain designs, it may not be possible or practical to include a space, which may leave no place to position the spring.

DISCLOSURE OF THE INVENTION

An object of one aspect of the present invention is to provide a floating mount, ball ramp style, mechanical caliper brake that includes a narrow radial height for easier removal for certain applications.

An object of another aspect of the present invention is to provide a floating mount, ball ramp style, mechanical caliper brake including a bridgeless, monocast housing construction to allow the brake to operate on relatively large rotor sizes.

An object of a further aspect of the present invention is to provide a floating mount, ball ramp style, mechanical caliper brake that includes a mechanism for keeping constant compressive loads on the centerline of the ball ramp mechanism to keep the balls and ramps in their proper position and provide positive retraction of the stators away from the rotor.

These and other objects of the present invention, as well as the advantages thereof over existing prior art forms, which will become apparent from the description to follow, are accomplished by the improvements hereinafter described and claimed.

In a first embodiment, the present invention provides a brake including a housing having an actuator side and a carrier side, a pair of caliper pads including a first pad nearer to the actuator side and a second pad nearer to the carrier side; the actuator side including a first plurality of ball ramps on an inner part thereof, and a pair of threaded holes, the carrier side including a pair of housing holes therethrough; a pair of bolts, each respectively passing through one of the pair of housing holes and being respectively threaded into one of the pair of threaded holes, to thereby compress a respective spring against the first pad; a lever having a second plurality of ball ramps facing the first plurality of ball ramps; and a plurality of balls, each being positioned between a respective one of the first plurality of ball ramps and a respective one of the second plurality of ball ramps; wherein the respective springs are positioned coplanar with a radial center of the first plurality of ball ramps and the second plurality of ball ramps, such that force of the respective springs provides constant compressive load on the first plurality of ball ramps and the second plurality of ball ramps, and such that the force does not cause the first pad to tip.

In a second embodiment, the present invention provides a brake as in any of the above embodiments, wherein the first pad includes a pair of reliefs each receiving a portion of a respective one of the pair of bolts.

In a third embodiment, the present invention provides a brake as in any of the above embodiments, wherein the housing is monocast.

In a fourth embodiment, the present invention provides a brake as in any of the above embodiments, wherein the housing is devoid of a central bridge.

In a fifth embodiment, the present invention provides a brake as in any of the above embodiments, wherein the pair of housing holes each include a wider portion for receiving a respective washer and a head of a respective one of the pair of bolts.

In a sixth embodiment, the present invention provides a brake as in any of the above embodiments, wherein the pair of housing holes are positioned internally relative to respective rigid support sections of the housing.

In a seventh embodiment, the present invention provides a brake as in any of the above embodiments, wherein the pair of housing holes each include a clearance portion bored from the actuator side to allow for ease of threading and machining.

In an eighth embodiment, the present invention provides a brake as in any of the above embodiments, wherein the brake is a floating mount caliper brake.

In a ninth embodiment, the present invention provides a brake as in any of the above embodiments, wherein the floating mount is characterized by the brake being mounted to a mounting bracket via a pair of sleeves, each being slidably mounted inside a respective bushing, such that when the first pad pushes on a rotor, the brake undergoes floating movement until the second pad also contacts the rotor.

In a tenth embodiment, the present invention provides a brake as in any of the above embodiments, wherein the pair of bolts are flange bolts.

In an eleventh embodiment, the present invention provides a brake as in any of the above embodiments, wherein the pair of bolts each include a washer under a bolt head.

In a twelfth embodiment, the present invention provides a brake including a housing having an actuator side and a carrier side, wherein the housing is monocast and devoid of a central bridge, the actuator side including a first plurality of ball ramps on an inner part thereof; a pair of caliper pads including a first pad nearer to the actuator side and a second pad nearer to the carrier side; a lever having a second plurality of ball ramps facing the first plurality of ball ramps; and a plurality of balls, each being positioned between a respective one of the first plurality of ball ramps and a respective one of the second plurality of ball ramps.

In a thirteenth embodiment, the present invention provides a brake as in any of the above embodiments, wherein there are three or more of the first plurality of ball ramps, three or more of the second plurality of ball ramps, and three or more of the plurality of balls.

In a fourteenth embodiment, the present invention provides a brake as in any of the above embodiments, wherein the brake is a floating mount caliper brake.

In a fifteenth embodiment, the present invention provides a brake as in any of the above embodiments, wherein the floating mount is characterized by the brake being mounted to a mounting bracket via a pair of sleeves, each being slidably mounted inside a respective bushing, such that when the first pad pushes on a rotor, the brake undergoes floating movement until the second pad also contacts the rotor.

In a sixteenth embodiment, the present invention provides a brake including a housing having an actuator side and a carrier side, a pair of caliper pads including a first pad nearer to the actuator side and a second pad nearer to the carrier side, the actuator side including a first plurality of ball ramps on an inner part thereof, the carrier side including a pair of housing holes therethrough; the first pad having a hole; a lever having a second plurality of ball ramps facing the first plurality of ball ramps and a lever hole; a plurality of balls, each being positioned between a respective one of the first plurality of ball ramps and a respective one of the second plurality of ball ramps; and a bolt threaded with a threaded hole and extending into the hole of the first pad, wherein the threaded hole is either the lever hole or an additional hole within a backing plate of the first pad.

In a seventeenth embodiment, the present invention provides a brake as in any of the above embodiments, the housing further including a counterbore holding a spring that is positioned between an end of the counterbore and a head of the bolt, wherein the head includes an optional washer thereunder.

In an eighteenth embodiment, the present invention provides a brake as in any of the above embodiments, wherein the bolt is positioned centrally within the first plurality of ball ramps and the second plurality of ball ramps, such that threading force of the bolt being within the threaded hole provides constant compressive load on the first plurality of ball ramps and the second plurality of ball ramps.

In a nineteenth embodiment, the present invention provides a brake as in any of the above embodiments, wherein actuation of the lever causes the bolt to move to a second position, thereby further compressing the spring.

A preferred exemplary brake according to the concepts of the present invention is shown by way of example in the accompanying drawings without attempting to show all the various forms and modifications in which the invention might be embodied, the invention being measured by the appended claims and not by the details of the specification.

DETAILED DESCRIPTION

One or more embodiments of the present invention relate to a mechanical ball ramp caliper brake. As will be further discussed below, the ball ramp caliper brake has a narrow radial height, which generally allows the brake to be more easily removed for service. In some embodiments, this narrow radial height can assist with enabling removal of the brake without removing an associated drum. Moreover, the brake can include a monocast, bridgeless housing, which allows the brake to operate on relatively large rotor sizes. The overall configuration of the brake also offers advantages relative to a ball ramp mechanism of the brake.

With reference to FIGS. 1 to 9, a mechanical ball ramp caliper brake according to one or more embodiments of the present invention is generally indicated by the numeral 10. Mechanical ball ramp caliper brake 10, which may also be referred to as ball ramp caliper brake 10, brake 10, or caliper brake 10, includes a housing, generally indicated by the numeral 12, which carries and protects components of brake 10 and locates brake 10 in operative relation to one or more other vehicle components (not shown). The associated vehicle component may be a drum.

Housing 12 includes a pair of bushings 14 within respective holes 16 (FIG. 7), each hole 16 being slightly offset from a center of the housing 12. Each of the bushings 14 slidably receive a respective sleeve 18. Said another way, each sleeve 18 is slidably mounted within the respective bushing 14. Each bushing 14 should be press fit into the respective hole 16 in order to hold the bushing 14 stationary to the housing 12 by the press fit tolerance. The holes 16 may be machined into the housing 12 in order to assist with achieving the press fit tolerance. As discussed below, the sleeves 18 are eventually secured to one or more other vehicle components. Each of the bushings 14, holes 16, and sleeve 18 are generally a hollow cylindrical shape. The housing 12 may be symmetrical or generally symmetrical about the center plane (that is, section A-A in FIG. 2).

An exemplary technique for securing housing 12, and therefore brake 10, to another vehicle component is to align the sleeves 18 with holes in a corresponding mounting bracket (not shown). Two fasteners (not shown), such as bolts with washers or flange bolts, can be inserted through the holes in the mounting bracket and through sleeves 18 and a flange nut (not shown) can be utilized to secure each bolt. The bolt and nut would therefore clamp the sleeves 18 to the mounting bracket. It may also be possible to thread the holes in the mounting bracket to thereby eliminate the need for the corresponding nuts.

Housing 12 is shown as a monocast component, meaning housing 12 is cast in one piece. The cast material provides rigid support sections 20 generally extending between a carrier side 12A and an actuator side 12B of the housing. The cast rigid support sections 20 are used instead of bolts and spacers as utilized in certain conventional brakes.

Figure 1:
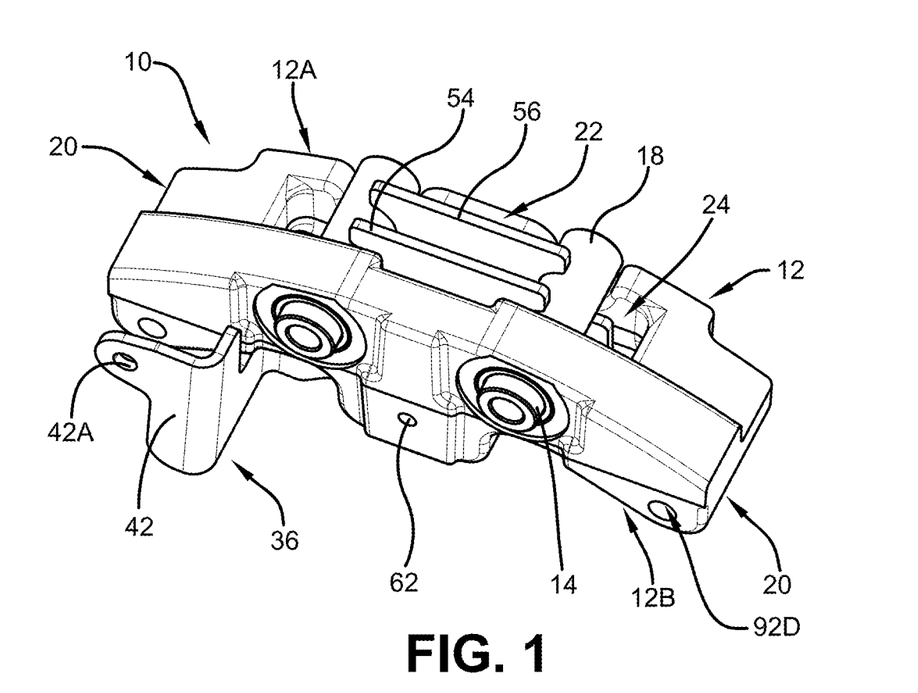
FIG. 1 is a top perspective view of a brake according to one or more embodiments of the present invention.
Figure 2:
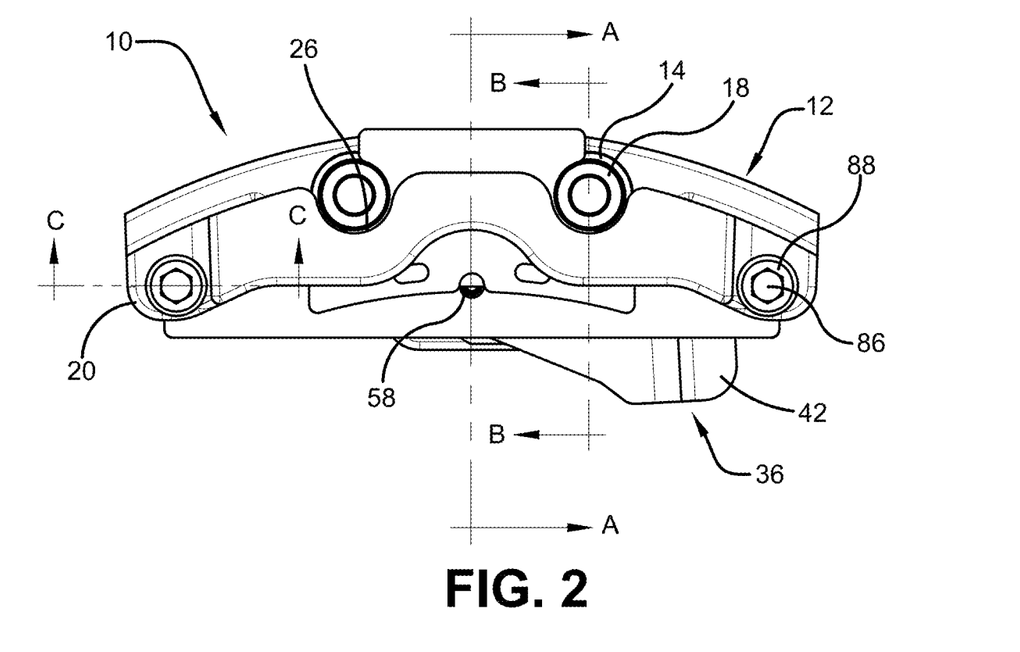
FIG. 2 is a front elevational view of the brake of FIG. 1.

As perhaps best shown in FIG. 1, housing 12 does not include a central bridge between cast rigid support sections 20, which may also be referred to the housing 12 being a bridgeless design. As generally known to the skilled person, the term bridgeless design refers to a design where any bridge structure of the brake is a tangentially located bridge, as opposed to a radially located bridge. Instead of having a central bridge, a caliper assembly 22 extends from a central opening 24 of the housing 12, which caliper assembly 22 will be further described herein.

On the carrier side 12A of cast housing 12, and opposite each bushing 14, is a respective cast clearance 26. Cast clearance 26 allows the respective sleeve 18 to pass through the carrier side 12A of cast housing 12 without interference. In order to match the shape of the sleeves 18, cast clearance 26 should generally be in the shape of a half cylinder.

Figure 3:
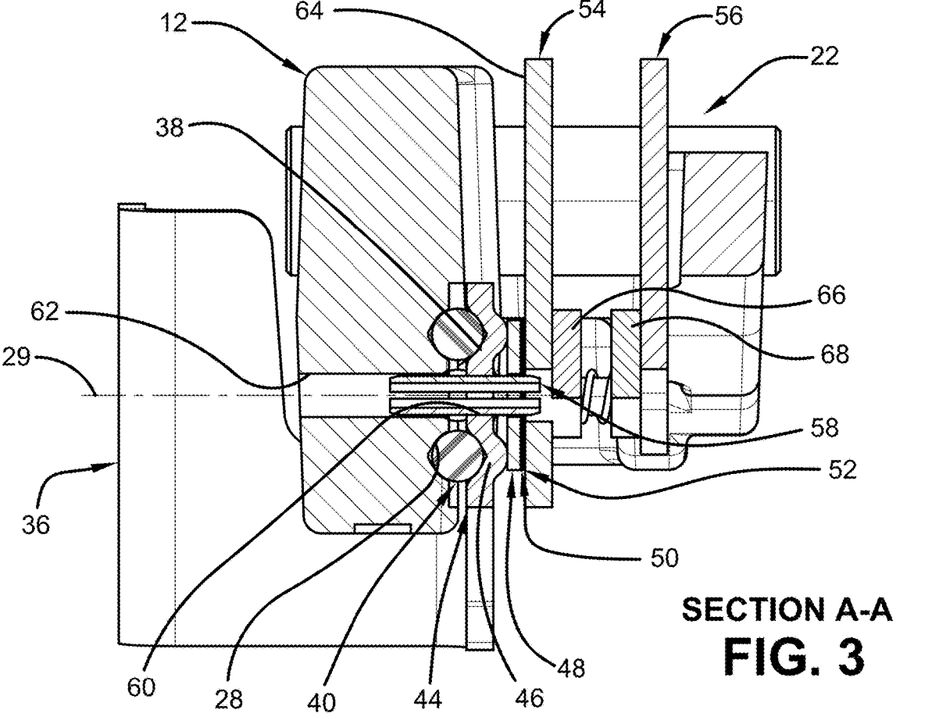
FIG. 3 is a sectional view taken substantially along line A-A of FIG. 2, showing a spring pin within a lever as part of a ball ramp mechanism, shown in an unlocked position.
Figure 4:
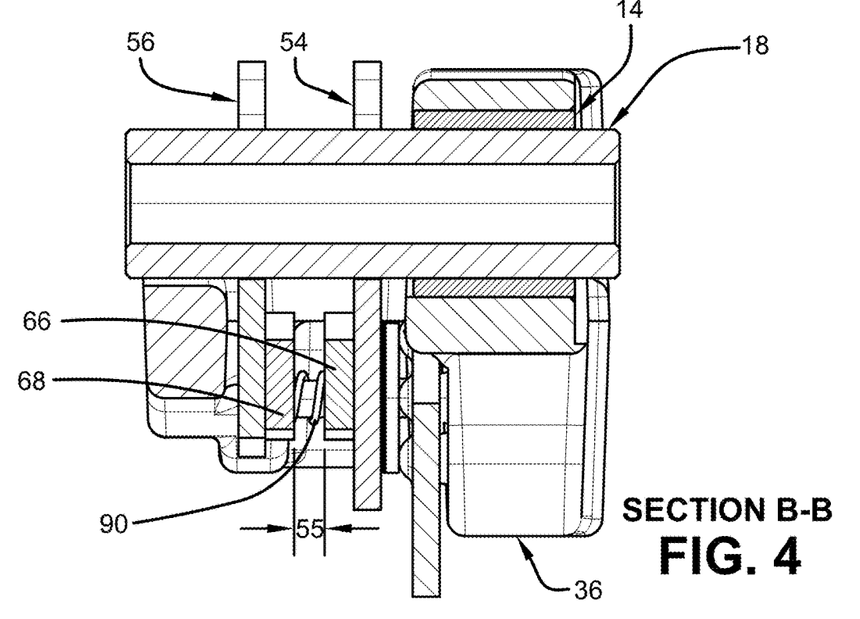
FIG. 4 is a sectional view taken substantially along line B-B of FIG. 2, showing a sleeve slidably mounted in a bushing.
Figure 6:
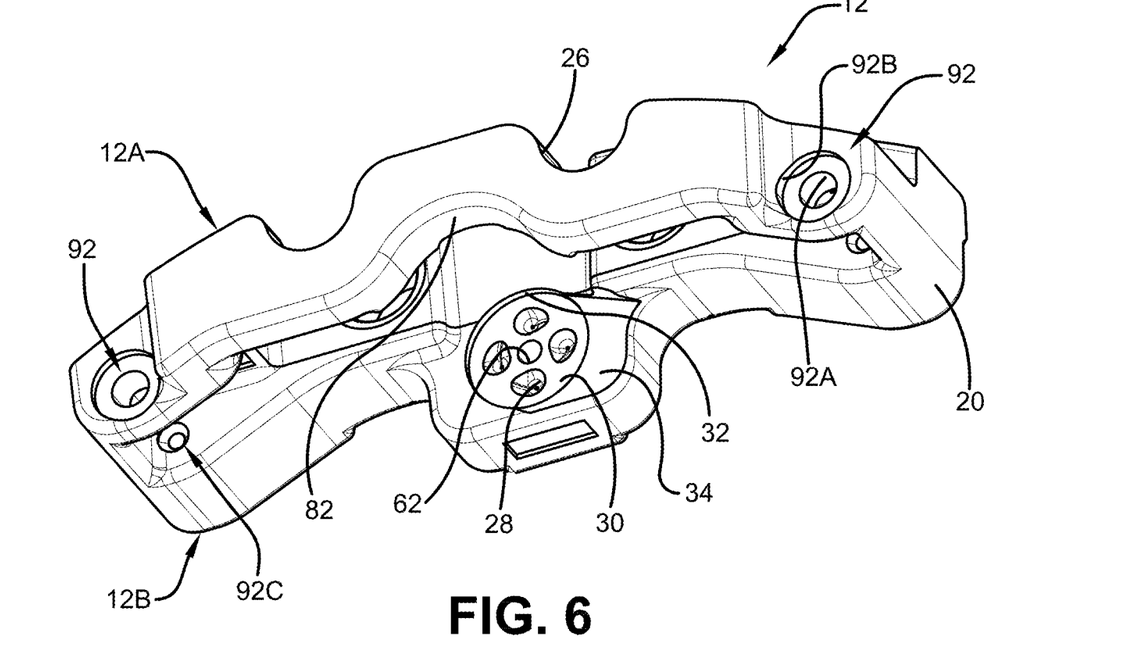
FIG. 6 is a bottom perspective view of a housing of the brake of FIG. 1, showing the housing and ramps of the ball ramp mechanism, and a machined counterbore around the ramps.
Figure 7:
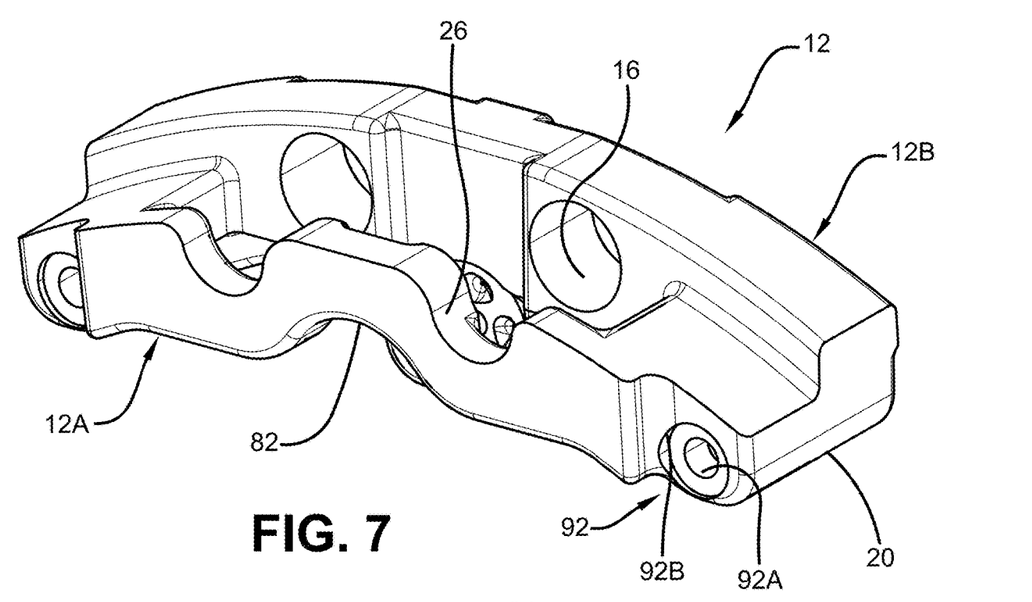
FIG. 7 is a top perspective view of the housing of the brake of FIG. 1, showing housing clearances for the sleeves.

Housing 12 is further designed to provide brake 10 with a ball ramp mechanism by way of ball ramps 28. As best seen in FIGS. 3 and 6, at a center, lengthwise speaking, of the inner part of the actuator side 12B of housing 12, ball ramps 28 are formed, such as by machining. Ramp 28 may be referred to as including a ball resting location swept up on a helix at a constant angle. Ramps 28, which may also be referred to as depressions 28, are shown in FIG. 6 as being formed in a single clockwise direction, relative to a locking direction. Though in other embodiments, ramps 28 could be formed in the opposite counterclockwise direction or could be bidirectional.

As best seen in FIG. 6, ball ramps 28 may be spaced equidistant from each other. Ball ramps 28 should be set upon a common radius about a radial center 29, which is depicted as a centerline 29 in FIG. 3 (dashed line in FIG. 3). This may also be referred to as the mechanism provided by ball ramps 28 having a center of force in the axial direction.

As shown in FIG. 6, where four ramps 28 are utilized, these may be at about the 3 o'clock, 6 o'clock, 9 o'clock, and 12 o'clock positions. In other embodiments, the four ramps 28 may be rotated 45 degrees from these positions, i.e. about the 1:30, 4:30, 7:30, and 10:30 positions. Other amounts of ramps 28 will be suitable. In one or more embodiments, ramps 28 may be heat treated.

A counterbore having a surface 30 and a perimeter 32 can be formed around the ball ramps 28. The counterbore can also be formed by machining the counterbore into the housing 12 surface. The counterbore generally serves to provide a clean surface to facilitate machining of the ball ramps 28.

A milled surface 34 can be present offset to the side from the ball ramps 28. The milled surface 34, which can be machined, generally serves to provide clearance to allow a lever 36 of the ball ramp mechanism to freely rotate.

Lever 36 has a number of ball ramps 38 corresponding to the number of ball ramps 28. The ball ramps 38 are positioned on a portion of lever 36 facing the actuator side 12B. The specific position of the ball ramps 38 within the portion of lever 36 should correspond with the position of ball ramps 28. The ball ramps 38 of lever 36 can be bidirectional, and can be formed by stamping. The bidirectional nature may serve to be easier for stamping. In one or more embodiments, ramps 38 may be heat treated.

The number of ball ramps 38 and ball ramps 28 (which also should be the number of balls 40 utilized) can be three or more, in other embodiments, four or more, in other embodiments, five or more, in other embodiments, from three to four, in other embodiments, from four to five, and in other embodiments, from three to five. The number of ball ramps 38 and ball ramps 28 may be determined by ball ramp contact stress, though other factors should be considered.

As with ball ramps 28, ball ramps 38 may be spaced equidistant from each other. As with ball ramps 28, ball ramps 38 should be set upon a common radius about radial center 29, which is depicted as centerline 29 in FIG. 3 (dashed line in FIG. 3). This may also be referred to as the mechanism provided by ball ramps 38 having a center of force in the axial direction.

Balls 40 are placed between the ramps 38 of lever 36 and the ramps 28 of housing 12. The ramps 38 and ramps 28 with balls 40 work together such that when lever 36 is rotated, the spherical or generally spherical balls 40 walk up the opposing ramps 38, 28 creating an efficient cam action. Lever 36 moves axially to push towards the rotor (not shown) to create the actuating force of the brake 10.

As best seen in FIG. 1, lever 36 can include a handle portion 42 that serves to operate a ball ramp mechanism portion 44 (FIG. 3) of lever 36. As shown in the FIG. 1, handle portion 42 may be generally L-shaped, which may also be referred to as handle portion 42 being bent. This bent shape may generally serve the purpose of allowing a desired attachment location 42A for a vehicle cable. In other embodiments, handle portion 42 may be straight or another suitable shape in order to accommodate other desired applications.

As best seen in FIG. 3, on the side opposite the ball ramps 38 on ball ramp mechanism portion 44 of lever 36, there are a corresponding number of semi-spherical protrusions 46, which may be formed by stamping. These spherical protrusions 46 are created when the ball ramps 38 are formed. The spherical protrusions 46 are generally concentric to the ball ramps 38 on the opposite side.

As shown in FIG. 3, a thrust washer 48 can be positioned over the spherical protrusions 46. Thrust washer 48 can be made from a hardened steel and can be nickel plated, in order to better resist corrosion and withstand the force of the protrusions 46 pushing against thrust washer 48 as to generally avoid bending, cracking, or otherwise deforming the washer 48.

At least one coated shim 50 can be positioned on top of washer 48, and at least one uncoated shim 52 can be placed on top of coated shim 50. Shim 50 (separate from a coating thereof) and shim 52 can be made from a hardened stainless steel to generally prevent corrosion and wear.

As mentioned above, shim 50 is a coated shim. Coated shim 50 can include a dry film lubricant as the coating, such as molybdenum disulfide, which generally allows coated shim 50 to rotate with low friction. Coated shim 50 therefore acts as a bearing surface.

Uncoated shim 52 is placed between the top shim 50 and a stationary pad 54 of caliper assembly 22. The number of shims 52 used can be varied to achieve a desired pad gap 55 between the first stationary pad 54 and a second stationary pad 56. Stationary pad 54 and stationary pad 56 may also be referred to as stator plates 54, 56 or caliper pads 54, 56. First caliper pad 54 may be referred to as being nearer the actuator side 12B of housing 12. Second caliper pad 56 may be referred to as being nearer the carrier side 12A of housing 12. In one or more embodiments, the one or more uncoated shims 52 may instead be coated shims, though this would generally only add unnecessary expense, as the one or more shims 52 are present only to achieve the pad gap 55. In one or more embodiments, only coated shim 50 is present without shim 52.

As shown in FIG. 3, a spring pin 58 is press fit into lever 36, such that the axial position of spring pin 58 is fixed relative to lever 36. Moreover, spring pin 58 rotates with lever 36 as lever 36 is rotated. Spring pin 58 also aligns washer 48 and shims 50, 52 concentric to a hole 60 in lever 36.

Spring pin 58 is slidably inserted by way of a hole 62 within housing 12. Hole 62 can be formed by machining and should be sized such that spring pin 58 does not interfere with the clearance hole 62 as the spring pin 58 rotates and moves with lever 36. As seen in FIG. 3, spring pin 58 ends up partially within hole 62 and extends to first stationary pad 54, specifically to a backing plate 64 thereof. This extension to stationary pad 54 generally serves to prevent any chance of dropping shims 50, 52 from the brake 10. To achieve this extension of spring pin 58 to backing plate 64, the press fit of the spring pin 58 to lever 36 should be at a set depth to achieve the desired extension of spring pin 58 to backing plate 64. The extension of spring pin 58 to backing plate 64 should also not be too deep as to impinge on lining material 66 of the stationary pad 54, which would otherwise cause potential problems such as reducing the available lining material and damaging the rotor.

Turning to further description of the caliper assembly 22, stationary pad 54 is positioned between shims 50, 52 and the rotor (not shown). As mentioned above, stationary pad 54 is lined with lining material 66, which is a suitable friction material that is intended to be in contact with the rotor. Stationary pad 56 is also lined with lining material 68. In order to assist with lining stationary pad 54 and stationary pad 56, backing plate 64 and backing plate 70 (FIG. 8) include two rounded slot shape holes 72. These holes 72 facilitate one suitable technique for adding lining material 66 and lining material 68, which technique is a compression molded lining. Other suitable lining techniques for adding lining material 66 and lining material 68 may or may not utilize the holes 72.

In accord with the above description relative to spring pin 58, Stationary pad 54 includes a centrally located hole 74 which accepts spring pin 58. The hole 74 in stationary pad 54 should allow clearance for spring pin 58, so that spring pin 58 can rotate freely inside of the hole 74 without interference when spring pin 58 is rotating with lever 36. The end of spring pin 58 is positioned inside the backing plate 64 of stationary pad 54, as discussed above.

As further description of pads, 54, 56, stationary pad 56 can include a relief 76 that is generally concentric with the centrally located hole 74 in stationary pad 54. This relief 76 may allow common tooling to be used for manufacturing of compression molded lining for pad 54 and pad 56; that is, stationary pad 54 could use the same lining tooling as stationary pad 56 if relief 76 is present.

Figure 8:
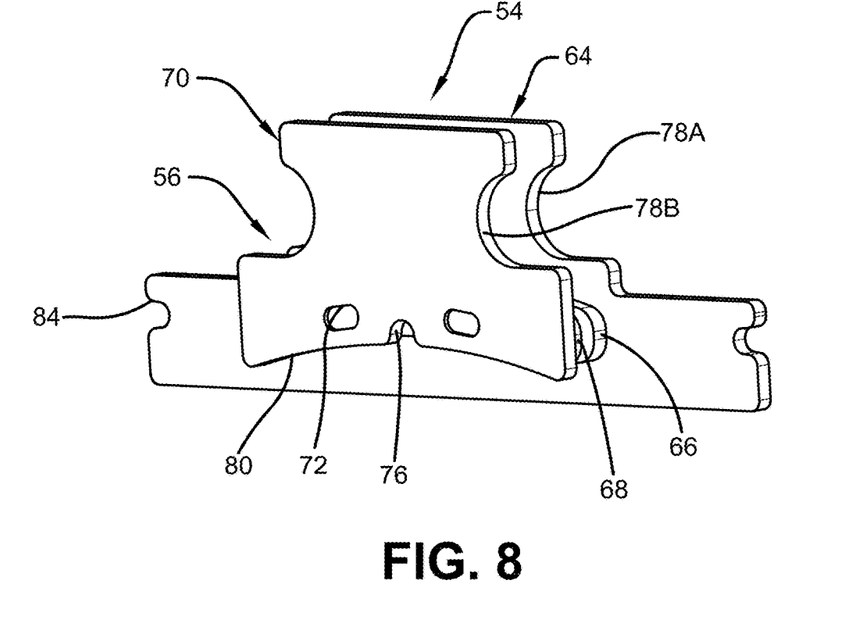
FIG. 8 is a perspective view of stator pads of the brake of FIG. 1.
Figure 9:
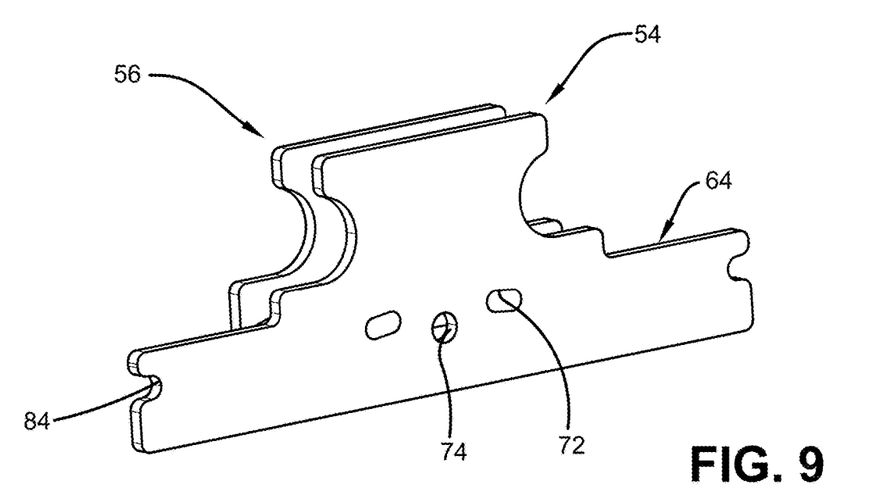
FIG. 9 is an alternative perspective view of the stator pads of the brake of FIG. 1.

As best seen in FIG. 8, both stationary pad 54 and stationary pad 56 include two respective arcuate surfaces 78A, 78B. Surface 78A, 78B are generally concentric to sleeves 18, as to receive sleeves 18 therein (FIG. 1). As brake torque is applied from the rotor to stationary pads 54, 56, the torque of stationary pads 54, 56 is reacted against sleeves 18. Where the sleeves 18 are rigidly clamped to a mounting bracket in the braking configuration, sleeves 18 transfer this torque load directly to the mounting bracket.

Stationary pad 56 is less wide (tangentially) than stationary pad 54 and pad 56 can include an arcuate bottom surface 80 (FIG. 8). This arcuate surface 80 has to clear the rotor during assembly and disassembly of the brake 10. As mentioned above, in one or more embodiments, the assembly and disassembly of the brake 10 is inside of a drum. This arcuate surface 80 provides relief that aids in the assembly and disassembly. Housing 12 can also include a similar arcuate relief shape 82 on the carrier side 12A to likewise aid in assembly and disassembly of brake 10.

Stationary pad 54 includes two arcuate openings 84 at the outer edge of the part. These openings 84, which may also be referred to as reliefs 84, should be located outside of the position of the corresponding rotor. These openings 84 assist in securing stationary pad 54 within the brake 10, as will be discussed below.

Relative to the braking mechanism of caliper assembly 22, as discussed above, when lever 36 is rotated, the camming action of the balls 40 and ball ramps 28, 38 cause lever 36 to move axially, pushing washer 48, shim 50, and shim 52 to urge stationary pad 54 into contact with the rotor. The actuating force on stationary pad 54 causes a braking effect on the rotor. Said another way, relative to the section A-A of FIG. 3, stationary pad 54 will be urged to the right into contact with the rotor (not shown). It should be appreciated that FIG. 3 shows the brake 10 in the unlocked position.

As suggested in the objects of the invention above, brake 10 is designed as a floating mount caliper brake, which is now discussed further. The force of stationary pad 54 pushing against the rotor causes a reaction force on the brake 10. Because brake 10 is mounted on sleeves 18 slidably mounted inside of bushings 14, and because this configuration is not axially rigid, the reaction force acting on the brake 10 pushes the brake assembly 10 left (as generally shown in section A-A in FIG. 3). The brake 10 therefore 'floats' in this manner until stationary pad 56 also contacts the rotor and thus creates braking action on that rotor surface as well.

Figure 5:
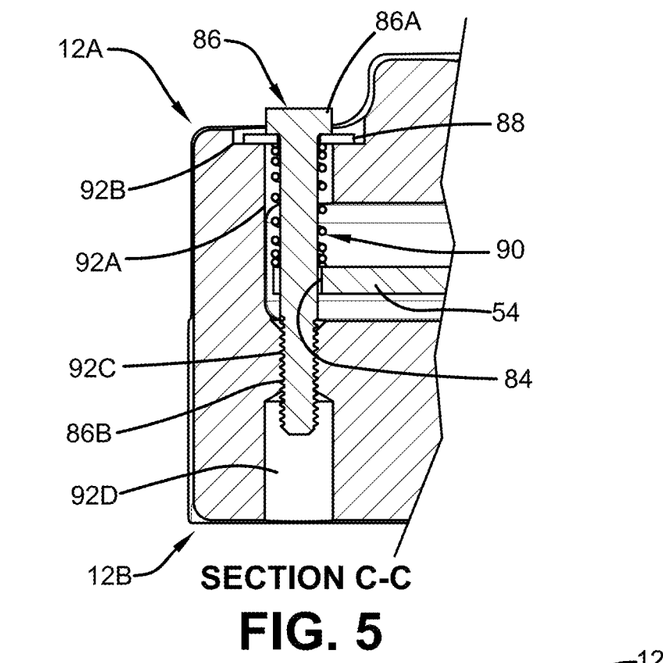
FIG. 5 is a sectional view taken substantially along line C-C of FIG. 2, showing a bolt, a washer, and a spring positioned in a hole in a housing of the brake.

As further discussion of assembly of brake 10, and the benefits of the assembly of brake 10 relative to the ball ramp mechanism, reference is specifically made to section C-C in FIG. 5. As shown in FIG. 5, a respective bolt 86, washer 88, and spring 90 are positioned in a pair of holes 92 (FIG. 6) in housing 12. Spring 90 extends between washer 88 and pad 54, and washer 88 is positioned between spring 90 and a head 86A of the bolt 86. In other embodiments, washer 88 may be eliminated and a flange bolt could be used for bolt 86.

As perhaps best seen in FIG. 6, holes 92 are positioned slightly internally from the respective rigid support section 20. At the carrier side 12A of housing 12, the overall hole 92 includes a hole portion 92A that is larger than the spring 90 for receiving and carrying a portion of the spring 90. The hole portion 92A, which may also be referred to as hole 92A, extends at the carrier side 12A to a wider portion 92B of overall hole 92 for receiving washer 88 and head 86A of the bolt 86.

At the actuator side 12B of housing 12, a hole portion 92C is threaded as to accept threading 86B of bolt 86. Hole portion 92C of overall hole 92 may also be referred to as hole 92C. Extending from portion 92C at actuator side 12B, a clearance portion 92D of overall hole 92 may be bored from the actuator side 12B behind the threaded portion 92C. Clearance portion 92D may be present to allow for ease of threading and machining.

Bolt 86 is placed in hole 92 such that a portion of bolt 86 is positioned within relief 84 of pad 54 and such that threading 86B of bolt 86 threads into threaded portion 92C in housing 12. This threading mechanism therefore compresses spring 90 between washer 88 and stationary pad 54. Stationary pad 54 transfers this force to shims 50, 52, to thrust washer 48, and onto the spherical projections 46 of lever 36. On the opposite side of lever 36, the ball ramps 38 transfer that force to balls 40 and onto the ball ramps 28 formed in housing 12. Thus, the force of spring 90 creates constant compressive load on the ball ramps 28, 38. This constant compressive load keeps the balls 40 in relative position with respect to one another, provides positive retraction of stationary pad 54 away from the rotor during non-braking events, and aids in returning lever 36 to a rest position when a braking event is finished.

Springs 90 should be located coplanar with the radial center 29 of the ball ramps 28, 38, which may be referred to as the center when considering all of the ball ramps 28, 38. This coplanar positioning should be such that the springs 90 do not cause stationary pad 54 to tip. More specifically, the centers of springs 90 should be located coplanar with the radial center 29 of the ball ramps 28, 38. This may also be referred to as the axis defined through the center of each spring 90 being coplanar with the axis defined between all the ball ramps 28, 38. This configuration should result in no applied moment to pad 54. This coplanar nature between springs 90 and the center of the ball ramps 28, 38 is perhaps best appreciated based on FIG. 2 in combination with FIG. 5.

This configuration of the respective bolt 86, washer 88, spring 90, and hole 92 makes assembly of bolt 86, washer 88, spring 90 relatively easy. All of the assembly steps can be done from the carrier side 12A of the brake 10, rather than alternatives of trying to squeeze a spring in between cast surfaces or between stationary pads on an inside of a brake.

Figure 10:
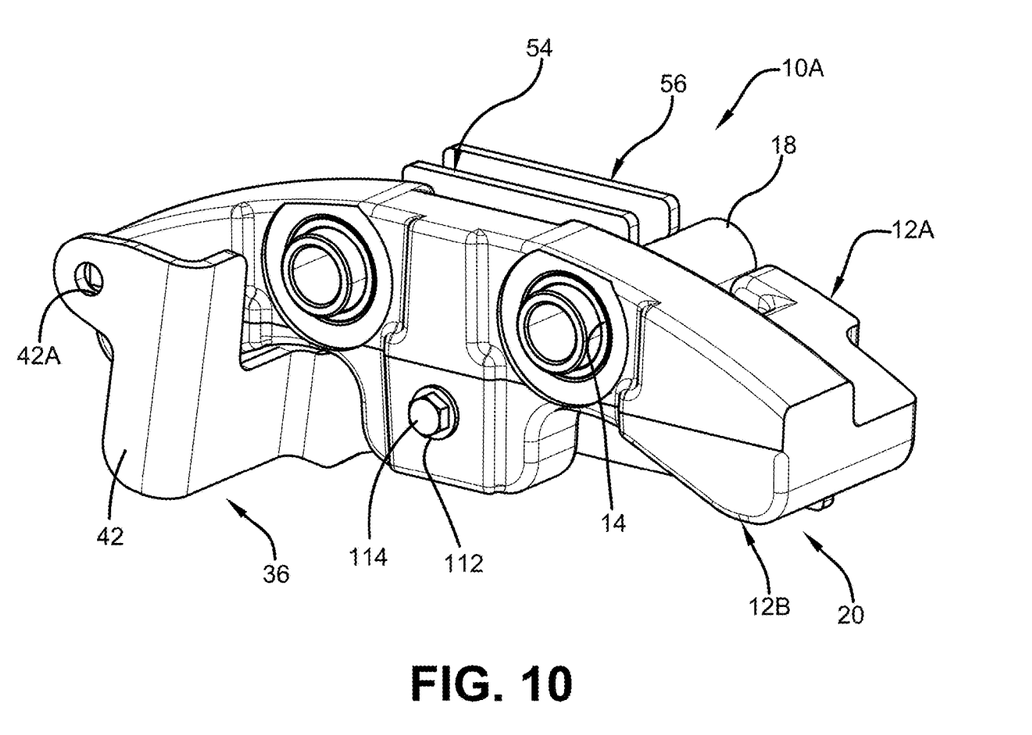
FIG. 10 is a front perspective view of a brake according to other embodiments of the present invention.
Figure 11:
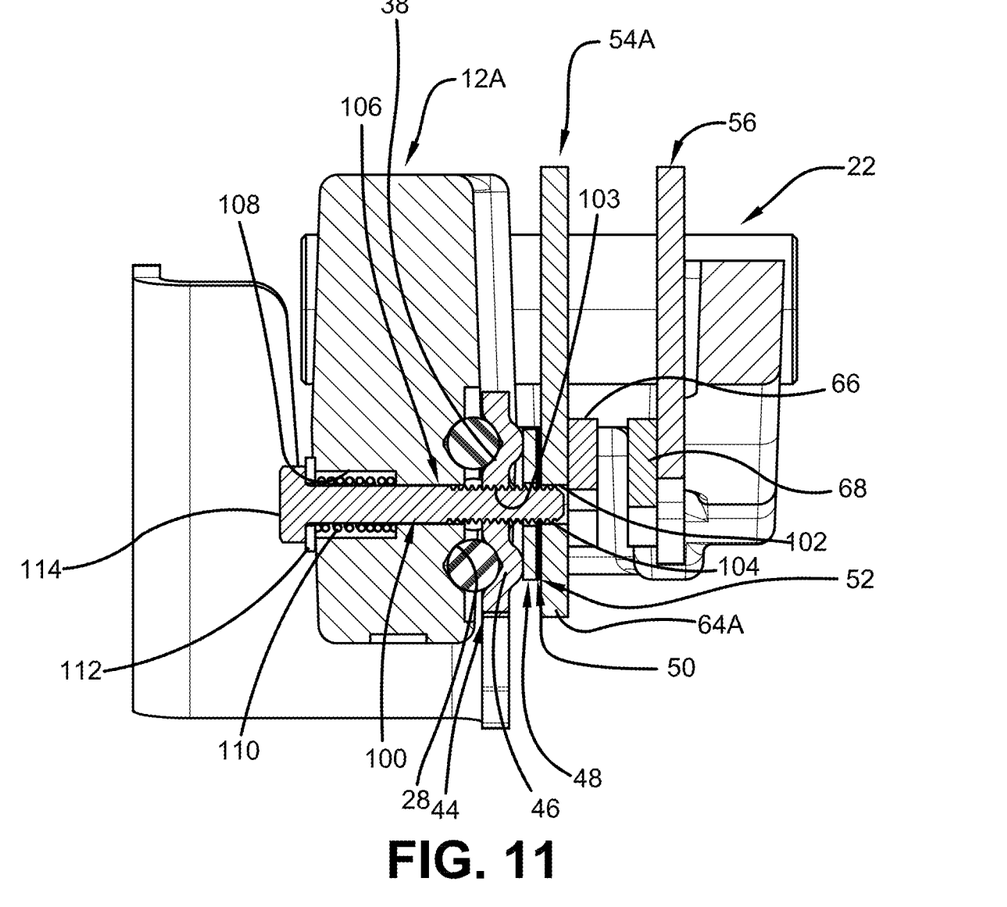
FIG. 11 is a sectional view taken substantially along a center of a ball ramp mechanism of the brake of FIG. 10, showing a bolt within a lever as part of the ball ramp mechanism, shown in an unlocked position.

With reference to FIGS. 10 and 11, an alternative main embodiment of a brake is shown. A ball ramp caliper brake according to one or more embodiments of the present invention is generally indicated by the numeral 10A. Ball ramp caliper brake 10A, which may also be referred to as brake 10A or caliper brake 10A, is in many respects similar to brake 10. Therefore, the like-for-like or similar components of brake 10A with brake 10 are not repeated here but are nonetheless incorporated here from the above disclosure. Also, certain similar numbering is therefore utilized in FIGS. 10 and 11. Certain differences between brake 10A and brake 10 are noted here. Also of note, FIG. 11 represents a sectional view taken substantially along a center of a ball ramp mechanism of the brake of FIG. 10, similar to section A—A provided in FIG. 3.

Brake 10A does not include bolts 86, washers 88, springs 90, and holes 92. Lever 36, thrust washer 48, and shims 50, 52 are unchanged, but spring pin 58 is not utilized. In place of spring pin 58, a threaded bolt 100, which may be a hex bolt 100, is utilized to align thrust washer 48, and shims 50, 52 with a center hole 103 in lever 36.

As shown in FIGS. 10 and 11, in one or more embodiments, center hole 103 can be a threaded center hole 103 such that threading 104 of the threaded bolt 100 interacts with threaded center hole 103 in lever 36. In other embodiments, threading 104 of the threaded bolt 100 could alternatively or additionally interact with threading (not shown in FIGS. 10 and 11) within hole 102 within backing plate 64A. A liquid thread securing composition could be used with a threaded connection.

The amount of threaded connection and the corresponding screw action of bolt 100 should be such that the distal end of the bolt 100 does not extend beyond hole 102. Said another way, the distal end of bolt 100 should be inside of hole 102 within the backing plate 64A of stationary pad 54A, in a similar manner as spring pin 58 discussed above. In embodiments where hole 102 is not threaded, there should be sufficient clearance between the bolt 100 and the hole 102. Of note, the configuration of brake 10A may require backing plate 64A to be thicker relative to backing plate 64 in order to provide additional thickness for hole 102.

A hole 106 in housing 12A contains a counterbore 108 that receives a compression spring 110 that is captured by a washer 112 under a head 114 of the threaded bolt 100. In other embodiments, the threaded bolt 100 and washer 112 could be replaced by a flange head bolt. When the threaded bolt 100 is screwed into the corresponding threading—i.e. one or more of threaded center hole 103 and a threaded hole (not shown) in backing plate 64A—the spring 110 is compressed.

As lever 36 is rotated with brake 10A, the brake 10A engages in a similar manner as brake 10. However, as stationary pad 54A moves to the right (relative to the sectional view in FIG. 11) by the ball ramp action, the bolt 100 also moves to the right because of the threaded connection (e.g. threaded center hole 103 with threading 104 of the threaded bolt 100). This rightward movement of the bolt 100 further compresses the spring 110. This generally centrally located spring 110, relative to the ball ramp mechanism, therefore keeps constant compressive load on the ball ramps 28, 38. And since this compressive load is centric to the ball ramps 28, 38, the compressive load creates no moment and does not tip stationary pad 54A.

Relative to the vehicle or application in which brake 10, 10A might be utilized, while aspects of the above disclosure mention the brake 10, 10A may be utilized with a drum of a wheel, other applications are also envisioned. Another example is a mining vehicle having a small rim to limit vehicle height along with a large hub in order to house a large wheel bearing. Other applications include any application requiring a brake for a tight radial space. The brake 10, 10A may be particularly useful when employed on a roller compactor. An exemplary roller compactor is a tandem vibratory roller used for compacting asphalt and various granular paving materials. The brake 10, 10A is also applicable for similar equipment and for other types of off-highway vehicles.

Based on the above, it is thus evident that a brake constructed as described herein accomplishes the objects of the present invention and otherwise substantially improves the art.

What is claimed is:
1. A caliper brake comprising
   a housing having an actuator side and a carrier side,
   a pair of caliper pads including a first pad nearer to the actuator side and a second pad nearer to the carrier side;
      the actuator side including a first plurality of ball ramps on an inner part thereof, and a pair of threaded holes,
      the carrier side including a pair of housing holes therethrough;
   a pair of bolts, each respectively passing through one of the pair of housing holes and being respectively threaded into one of the pair of threaded holes, to thereby compress a respective spring against the first pad;

a lever having a second plurality of ball ramps facing the first plurality of ball ramps; and a plurality of balls, each being positioned between a respective one of the first plurality of ball ramps and a respective one of the second plurality of ball ramps;

wherein the respective springs are positioned coplanar with a radial center of the first plurality of ball ramps and the second plurality of ball ramps, such that force of the respective springs provides constant compressive load on the first plurality of ball ramps and the second plurality of ball ramps, and such that the force does not cause the first pad to tip.

2. The brake of claim 1, wherein the first pad includes a pair of reliefs each receiving a portion of a respective one of the pair of bolts.

3. The brake of claim 1, wherein the housing is monocast.

4. The brake of claim 1, wherein the housing is devoid of a central bridge.

5. The brake of claim 1, wherein the pair of housing holes each include a wider portion for receiving a respective washer and a head of a respective one of the pair of bolts.

6. The brake of claim 1, wherein the pair of housing holes are positioned internally relative to respective rigid support sections of the housing.

7. The brake of claim 1, wherein the pair of housing holes each include a clearance portion bored from the actuator side to allow for ease of threading and machining.

8. The brake of claim 1, wherein the brake is a floating mount caliper brake.

9. The brake of claim 8, wherein the floating mount is characterized by the brake being mounted to a mounting bracket via a pair of sleeves, each being slidably mounted inside a respective bushing, such that when the first pad pushes on a rotor, the brake undergoes floating movement until the second pad also contacts the rotor.

10. The brake of claim 1, wherein the pair of bolts are flange bolts.

11. The brake of claim 1, wherein the pair of bolts each include a washer under a bolt head.

12. A caliper brake comprising a housing having an actuator side and a carrier side, wherein the housing is monocast and devoid of a central bridge, the actuator side including a first plurality of ball ramps on an inner part thereof;

a pair of caliper pads including a first pad nearer to the actuator side and a second pad nearer to the carrier side;

a lever having a second plurality of ball ramps facing the first plurality of ball ramps; and a plurality of balls, each being positioned between a respective one of the first plurality of ball ramps and a respective one of the second plurality of ball ramps.

13. The brake of claim 12, wherein there are three or more of the first plurality of ball ramps, three or more of the second plurality of ball ramps, and three or more of the plurality of balls.

14. The brake of claim 12, wherein the brake is a floating mount caliper brake.

15. The brake of claim 14, wherein the floating mount is characterized by the brake being mounted to a mounting bracket via a pair of sleeves, each being slidably mounted inside a respective bushing, such that when the first pad pushes on a rotor, the brake undergoes floating movement until the second pad also contacts the rotor.

16. A caliper brake comprising a housing having an actuator side and a carrier side, a pair of caliper pads including a first pad nearer to the actuator side and a second pad nearer to the carrier side, the actuator side including a first plurality of ball ramps on an inner part thereof, the carrier side including a pair of housing holes therethrough;

the first pad having a hole;

a lever having a second plurality of ball ramps facing the first plurality of ball ramps and a lever hole;

a plurality of balls, each being positioned between a respective one of the first plurality of ball ramps and a respective one of the second plurality of ball ramps; and a bolt threaded with a threaded hole and extending into the hole of the first pad, wherein the threaded hole is either the lever hole or an additional hole within a backing plate of the first pad.

17. The brake of claim 16, the housing further including a counterbore holding a spring that is positioned between an end of the counterbore and a head of the bolt, wherein the head includes an optional washer thereunder.

18. The brake of claim 17, wherein the bolt is positioned centrally within the first plurality of ball ramps and the second plurality of ball ramps, such that threading force of the bolt being within the threaded hole provides constant compressive load on the first plurality of ball ramps and the second plurality of ball ramps.

19. The brake of claim 17, wherein actuation of the lever causes the bolt to move to a second position, thereby further compressing the spring.

\* \* \* \* \*